United States Patent
Huang et al.

(10) Patent No.: US 9,507,604 B2
(45) Date of Patent: Nov. 29, 2016

(54) BOOT METHOD AND BOOT SYSTEM

(71) Applicant: Insyde Software Corp., Taipei (TW)

(72) Inventors: Yi Fang Huang, Taipei (TW); Chao Ming Chang, Taipei (TW); Yu Chieh Tsai, Taipei (TW)

(73) Assignee: INSYDE SOFTWARE CORPORATION, Taipei (TW)

( * ) Notice: Subject to any disclaimer, the term of this patent is extended or adjusted under 35 U.S.C. 154(b) by 318 days.

(21) Appl. No.: 14/481,344

(22) Filed: Sep. 9, 2014

(65) Prior Publication Data

US 2015/0074386 A1 Mar. 12, 2015

(30) Foreign Application Priority Data

Sep. 9, 2013 (TW) ................... 102132386 A

(51) Int. Cl.
G06F 9/44 (2006.01)
(52) U.S. Cl.
CPC .................. *G06F 9/4401* (2013.01)
(58) Field of Classification Search
CPC ................... G06F 9/4401; G06F 9/441
See application file for complete search history.

(56) References Cited

U.S. PATENT DOCUMENTS

| 9,250,919 B1* | 2/2016 | Narey ..................... G06F 9/441 |
| 2010/0042821 A1* | 2/2010 | Harmer ................. G06F 9/4411 713/2 |
| 2011/0179406 A1* | 7/2011 | Ohama ................... G06F 8/665 717/168 |

* cited by examiner

*Primary Examiner* — Albert Wang
(74) *Attorney, Agent, or Firm* — Muncy, Geissler, Olds & Lowe, P.C.

(57) ABSTRACT

A boot method for a platform system including a Universal Extensible Firmware Interface (UEFI) Basic Input/Output System (BIOS) is provided. The UEFI BIOS includes partitions storing an initial boot program code, a factory setting boot program code, a first customized boot program code, a second customized boot program code and boot information respectively. The provided method comprises steps of: loading the initial boot program code stored in one of the partitions of the UEFI BIOS into a memory, and executing the initial boot program code stored in the memory by a CPU to perform a first phase of boot; and loading one of the factory setting boot program code, the first customized boot program code and the second customized boot program code stored in the partitions of the UEFI BIOS into the memory according to data in the boot information, and executing the program code loaded in the memory to perform a second phase of boot by the CPU.

16 Claims, 9 Drawing Sheets

_US 9,507,604 B2_

BOOT METHOD AND BOOT SYSTEM

BACKGROUND OF THE INVENTION

1. Field of the Invention

The present invention relates to a boot method and more particularly to a boot method for a platform system comprising a Universal Extensible Firmware Interface (UEFI) Basic Input/Output System (BIOS); the present invention also relates to a boot system comprising a UEFI BIOS for implementing the boot methods and to a recording medium storing a program which causes a platform system to implement the boot methods.

2. Background of the Invention

A BIOS is a program embedded in a Read Only Memory (ROM) on a motherboard of a platform system such as a computer, a tablet or a smart phone in the manufacture thereof, and is by definition a firmware on the motherboard and plays a role for communicating between the hardware and an operating system. Operation of a platform system, including relevant parameters of its hardware, can be adjusted by means of a BIOS in which basic input/output programs related and essential to the platform system, system information settings, Power On Self Test (POST), system bootstrap programs, etc. is stored. While a platform system is powered up, the BIOS performs a test on the platform system by using associated programs. After the test is completed, the operating system is loaded into a memory such as dynamic random access memory (DRAM) of the platform system. If the BIOS is damaged or out of function due to, for example, a virus attack, the platform system will not boot successfully.

Accordingly, design for multiple BIOS modules is adopted in modern platform systems to prevent from the boot failure as described above. In such design, a backup BIOS module is provided in addition to the original primary BIOS module. Once the primary BIOS module is damaged or out of function, the backup BIOS module will take over to perform the boot procedure of the platform system and recover the primary BIOS module. However, the design of multiple BIOS modules needs to be realized by using two hardware devices such as Serial Peripheral Interface (SPI) ROMs, and therefore the hardware cost increases.

BRIEF SUMMARY OF THE INVENTION

In view of the above-mentioned problems, the present invention provides a boot method for a platform system comprising a UEFI BIOS, and a boot system comprising a UEFI BIOS for implementing said methods. In the present invention, single hardware is used to accomplish the function of multiple BIOS and to reduce the hardware cost of the platform system.

A first aspect of the present invention is to provide a boot method for a platform system including a UEFI BIOS which has partitions for storing an initial boot program code, a factory setting boot program code, a first customized boot program code, a second customized boot program code and boot information respectively. The method comprises steps of: loading the initial boot program code stored in one of the partitions of the UEFI BIOS into a memory, and executing the initial boot program code stored in the memory by a CPU to perform a first phase of boot; and loading one of the factory setting boot program code, the first customized boot program code and the second customized boot program code stored in the partitions of the UEFI BIOS into the memory according to data in the boot information, and executing the program code loaded in the memory to perform a second phase of boot by the CPU.

A second aspect of the present invention is to provide another boot method for a platform system including a UEFI BIOS which has partitions storing an initial boot program code, a factory setting boot program code, a first customized boot program code, a second customized boot program code and boot information respectively. The method comprises steps of: loading a program code of system firmware file into a memory; determining which one of the partitions storing the first and the second customized boot program codes respectively is to be updated according to data of the boot information, and updating the determined one of the partitions storing the first and the second customized boot program codes respectively with the program code of system firmware file stored in the memory; and loading the updated one of the first and the second customized boot program codes stored respectively in the partitions of the UEFI BIOS into the memory, and executing the updated one of the first and the second customized boot program codes in the memory to boot the platform system.

A third aspect of the present invention is to provide another boot method for a platform system including a UEFI BIOS in which an initial boot program code, a factory setting boot program code, a first customized boot program code and first boot information are stored. The method comprises steps of: loading the initial boot program code into a memory, and executing the initial boot program code stored in the memory to perform a first phase of boot, whereby the platform system is enabled to connect with a remote server in which a second customized boot program code and second boot information are stored; and loading one of the factory setting boot program code, the first customized boot program code and the second customized boot program code into the memory according to data in the first and second boot information, and executing the program code loaded into the memory to perform a second phase of boot.

A forth aspect of the present invention is to provide another boot system for a platform system comprising a UEFI BIOS having partitions storing an initial boot program code, a factory setting boot program code, a first customized boot program code and first boot information respectively, wherein the platform system is enabled to connect with a remote server in which a second customized boot program code and second boot information are stored; a memory for storing the initial boot program code, the factory setting boot program code, the first customized boot program code or the second customized boot program code; and a CPU for executing the initial boot program code, the factory setting boot program code, the first customized boot program code or the second customized boot program code stored in the memory so as to boot the platform system. The boot system is capable of implementing the boot methods according to the third aspect of the present invention.

DETAILED DESCRIPTION OF THE INVENTION

In order to make the disclosure more comprehensible for a person having ordinary skill in the art, several preferred embodiments of the present invention are provided hereinafter with reference to the accompanying drawings so as to illustrate the present invention in more detail.

Figure 1:
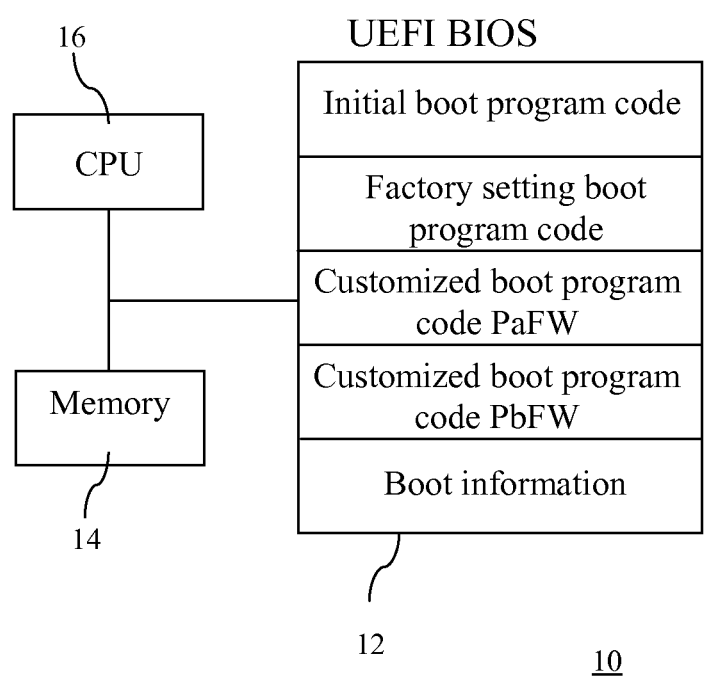
FIG. 1 is a system block diagram of a boot and update system according to one embodiment of the present invention.

FIG. 1 is a block diagram of a boot and update system comprising a UEFI BIOS according to the present invention. In FIG. 1, a platform system 10 (e.g. a computer, a tablet or a smart phone) comprises a UEFI BIOS 12, a memory 14 and a CPU 16.

The UEFI BIOS 12 is divided into a plurality of partitions for storing an initial boot program code, a factory setting boot program code, a customized boot program code PaFW, a customized boot program code PbFW and boot information respectively, wherein an example of the storage partitions is an Embedded Multi Media Card (eMMC) device or an SPI device. One or more of the initial boot program code, the factory setting boot program code, the customized boot program code PaFW, the customized boot program code PbFW and the boot information can be loaded into the memory 14. The CPU 16 executes the program code stored in the memory 14 to boot the platform system 10. In the UEFI BIOS 12, the addresses and sizes of the partitions for storing the customized boot program code PaFW and the customized boot program code PbFW are variable.

Figure 2:
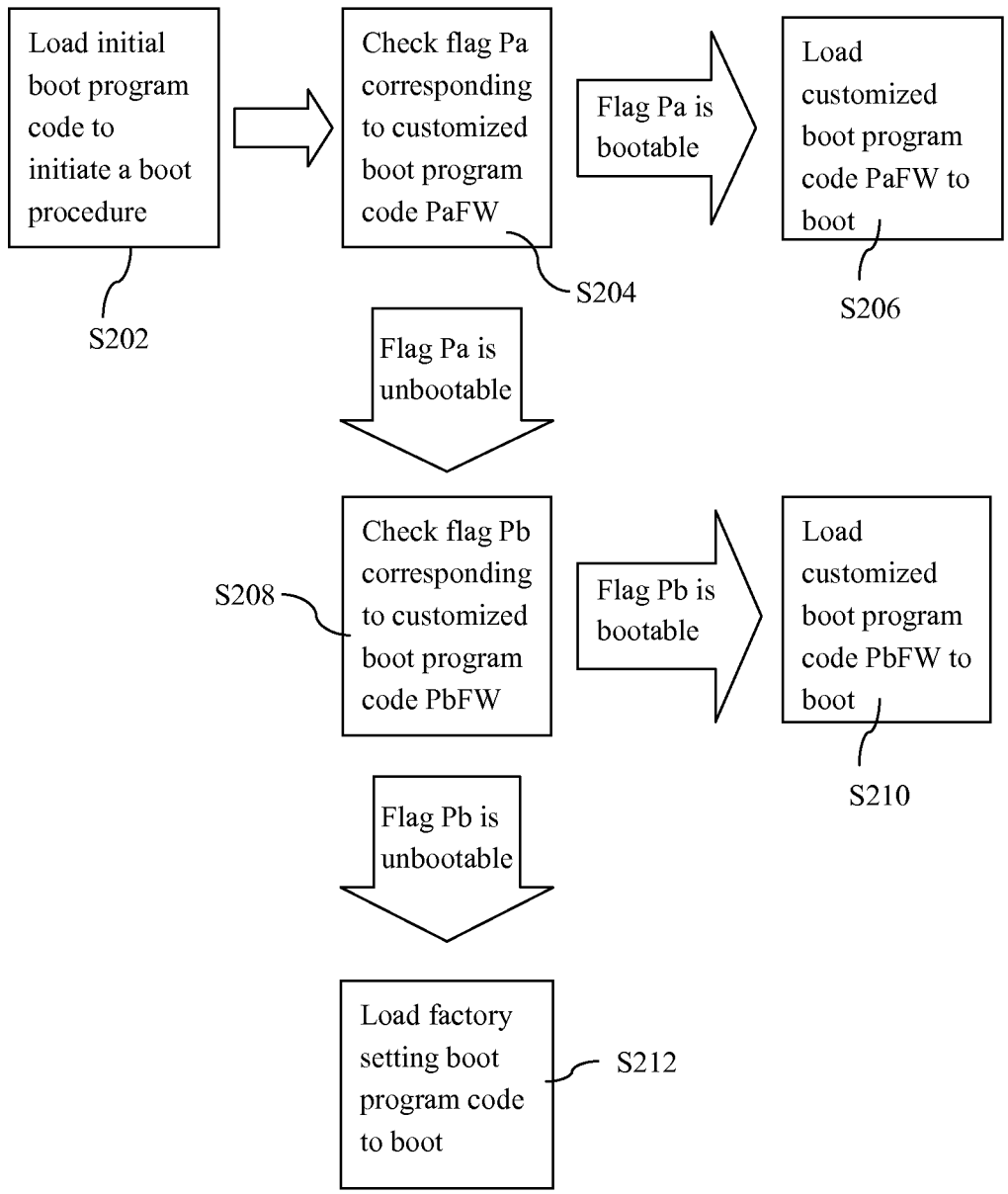
FIG. 2 is a flowchart of a boot method according to one embodiment of the present invention.

FIG. 2 is a flowchart of a boot method for a platform system comprising a UEFI BIOS according to the present invention. The flow steps in FIG. 2 is explained with reference to the components shown in FIG. 1.

In FIG. 2, the initial boot program code is loaded into the memory 14 from the partition storing the initial boot program code of the UEFI BIOS 12 in the platform system 10, and the CPU 16 executes the initial boot program code in the memory 14 to perform a first phase of boot (step S202). In one embodiment of the present invention, the initial boot program code may comprise a Security (SEC) phase program code and a Pre-Extensible Firmware Interface Initialization (Pre-EFI Initialization; PEI) phase program code, and thus the CPU 16 executes the SEC phase program code and the PEI phase program code in the memory 12 to perform the first phase of boot.

After executing the SEC phase program code and the PEI phase program code, the CPU 16 reads a flag Pa and a flag Pb in boot information, which corresponding respectively to the customized boot program code PaFW and the customized boot program code PbFW, to determine which of the factory setting boot program code, the customized boot program code PaFW and the customized boot program code PbFW is to be executed.

Firstly, the CPU 16 checks the flag Pa corresponding to the customized boot program code PaFW to determine whether the customized boot program code PaFW is to be executed to perform a second phase of boot (step S204). If the flag Pa is set to bootable, the customized boot program code PaFW is loaded into the memory 14 from the partition storing the customized boot program code PaFW of the UEFI BIOS 12 in the platform system 10, and the CPU 16 executes the customized boot program code PaFW in the memory 14 to perform a second phase of boot (step S206).

In one embodiment of the present invention, the first customized boot program code PaFW may comprise a Driver Execution Environment (DXE) phase program code and a Boot Device Selection (BDS) phase program code, and be designed and updated based on a user's requirements. Accordingly, the CPU 16 executes the DXE phase program code and the BDS phase program code in the memory 14 to perform the second phase of boot.

If the flag Pa is set to unbootable, the CPU 16 checks the flag Pb corresponding to the customized boot program code PbFW to determine whether the customized boot program code PbFW is to be executed to perform a second phase of boot (step S208). If the flag Pb is set to bootable, the customized boot program code PbFW is loaded into the memory 14 from the partition storing the customized boot program code PbFW of the UEFI BIOS 12 in the platform system 10, and the CPU 16 executes the customized boot program code PbFW in the memory 14 to perform a second phase of boot (step S210).

In one embodiment of the present invention, the customized boot program code PbFW may comprise a DXE phase program code and a BDS phase program code, which could be designed and updated based on a user's requirements, and the CPU 16 executes the DXE phase program code and the BDS phase program code in the memory 14 to perform the second phase of boot.

If the flag Pb is set to unbootable, the factory setting boot program code is loaded into the memory 14 from the partition storing the factory setting boot program code of the UEFI BIOS 12 in the platform system 10, and the CPU 16 executes the factory setting boot program code in the memory 14 to perform a second phase of boot (step S212).

In one embodiment of the present invention, the factory setting boot program code may comprise a DXE phase program code and a BDS phase program code, and be configured in the manufacture of the platform system 10. Accordingly, the CPU 16 executes the DXE phase program code and the BDS phase program code in the memory 14 to perform the second phase of boot.

Figure 3:
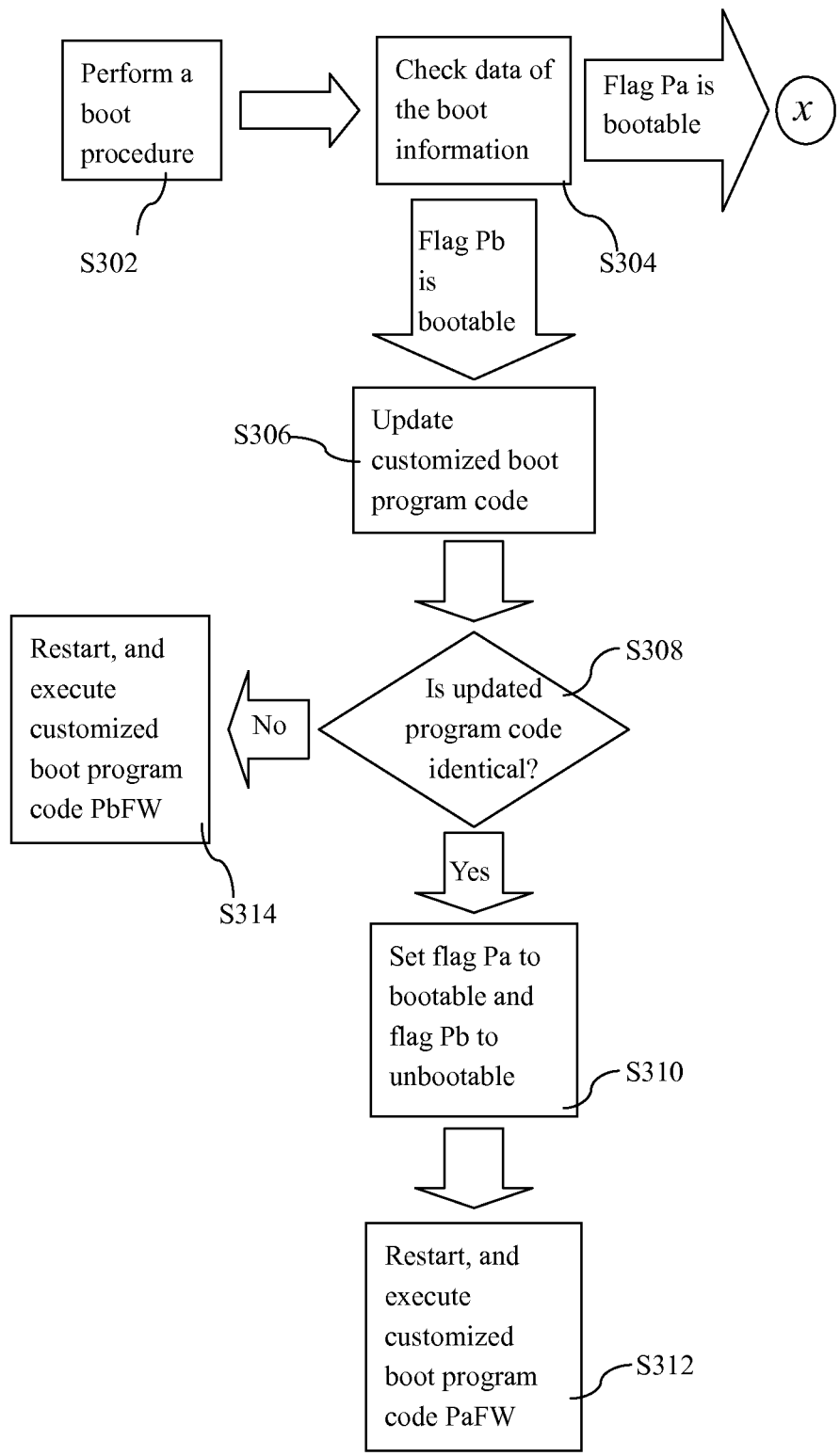
FIG. 3 is a flowchart of a boot and update method according to one embodiment of the present invention.
Figure 3:
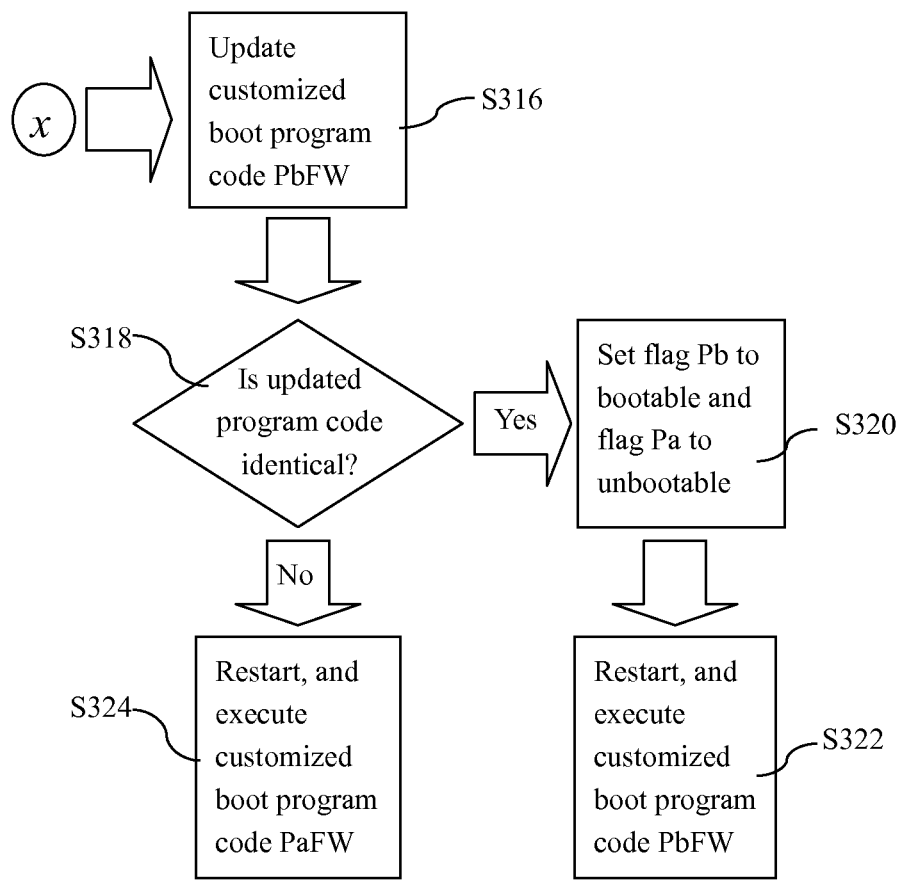

FIG. 3 is a flowchart of a boot and update method for a platform system comprising a UEFI BIOS according to the present invention. The flow steps in FIG. 3 is explained with reference to the components shown in FIG. 1.

In FIG. 3, a platform system 10 performs a boot procedure composed of flow steps shown in FIG. 2 (step S302).

After the boot procedure is completed, a program code of system firmware file is loaded from a recording medium or an external network into the memory 14 in the platform 10 so as to update one of the customized boot program codes PaFW and PbFW which needs to be updated. The CPU 16 reads flags Pa and Pb corresponding respectively to the customized boot program codes PaFW and PbFW from the boot information stored in one of the partitions of the UEFI BIOS 12, and accordingly update the partition of the customized boot program code PaFW or the partition of the customized boot program code PbFW (step S304).

If the flag Pb is set to bootable, the partition storing the customized boot program code PaFW will be updated with the program code of system firmware file stored in the memory 14 of the platform system 10 (step S306). Then, it is determined whether the program code of system firmware file is identical to the updated customized boot program code PaFW in the updated partition (step S308).

In case the program code of system firmware file is identical to the updated customized boot program code PaFW, the flag Pb corresponding to the customized boot program code PbFW will be set to unbootable and the flag Pa corresponding to the customized boot program code PaFW will be set to bootable in the boot information stored in one of the partitions of the UEFI BIOS 12 in the platform system 10 (step S310). Then, the platform system 10 restarts and performs a boot procedure composed of aforementioned flow steps S202, S204 and S206 of FIG. 2 (step S312).

In case the program code of system firmware file is different from the updated customized boot program code PaFW, the platform system 10 will restart and perform a boot procedure composed of aforementioned flow steps S202, S204, S208 and S210 of FIG. 2 (step S314).

If the flag Pa is set to bootable, the partition storing the customized boot program code PbFW will be updated with the program code of system firmware file stored in the memory 14 of the platform system 10 (step S316). Then, it is determined whether the program code of system firmware file is identical to the updated customized boot program code PbFW in the updated partition (step S318).

In case the program code of system firmware file is identical to the updated customized boot program code PbFW, the flag Pa corresponding to the customized boot program code PaFW will be set to unbootable and the flag Pb corresponding to the customized boot program code PbFW will be set to bootable in the boot information stored in one of the partitions of the UEFI BIOS 12 in the platform system 10 (step S320). Then, the platform system 10 restarts and performs a boot procedure composed of the aforementioned flow steps S202, S204, S208 and S210 of FIG. 2 (step S322).

In case the program code of system firmware file is different from the updated customized boot program code PbFW, the platform system 10 will restart and perform a boot procedure composed of the aforementioned flow steps S202, S204 and S206 of FIG. 2 (step S324).

Figure 4:
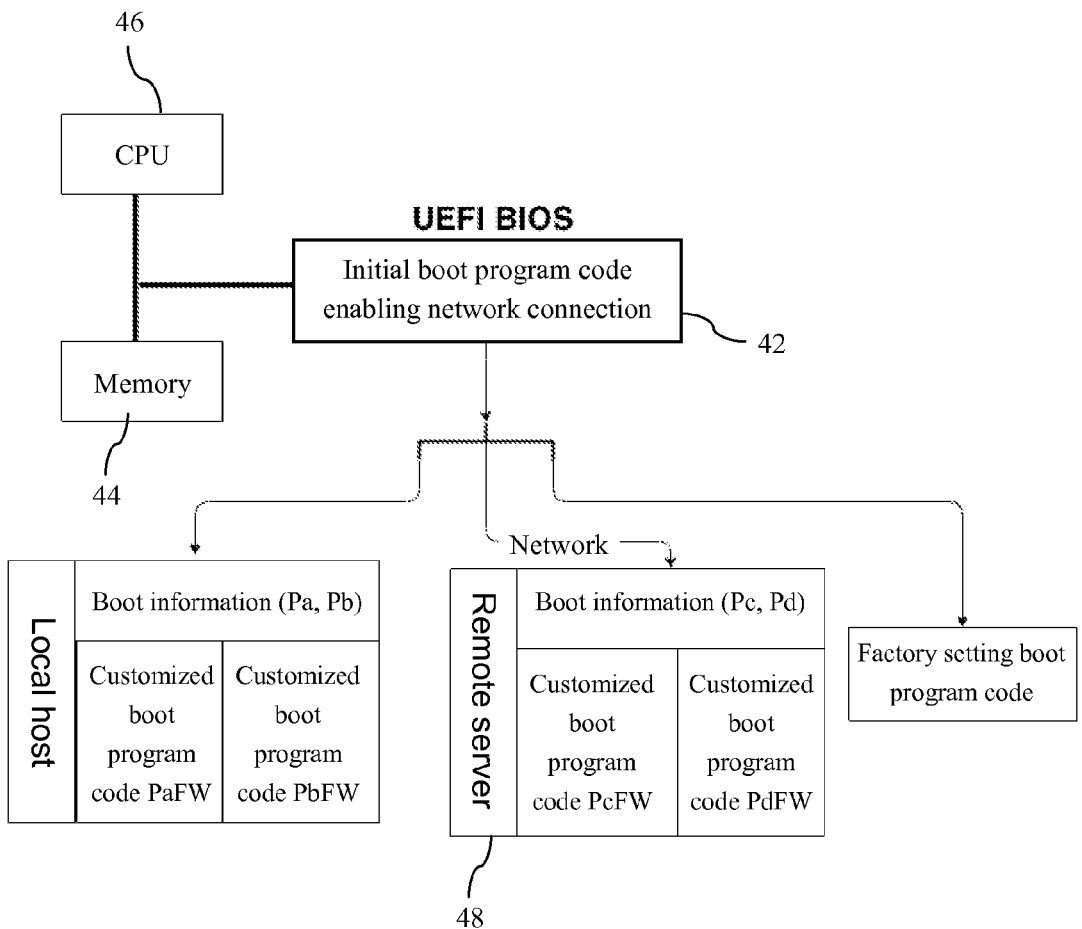
FIG. 4 is a system block diagram of a boot and update system connecting with a remote server according to one embodiment of the present invention.

FIG. 4 is a block diagram of a boot and update system comprising a UEFI BIOS 42 according to the present invention. In contrast with the boot and update system 10 shown in FIG. 1, an initial boot program code comprised in the UEFI BIOS 42 is capable of enabling a network connection, and capable of enabling a network connection can be implement on Security (SEC) phase program code, Pre-Extensible Firmware Interface Initialization (Pre-EFI Initialization; PEI) phase program code or early stage of Driver Execution Environment (DXE) phase. Therefore, a platform system having the UEFI BIOS 42 is allowed to access boot information and download a customized boot program code PcFW or PdFW stored in a remote server 48 via the network connection, and to execute the customized boot program code PcFW or PdFW to carry out a boot procedure.

FIG. 5 is a flowchart of a boot method for a platform system comprising the UEFI BIOS 42 described above, and the flow steps in FIG. 5 are explained with reference to the components shown in FIG. 4.

Figure 5:
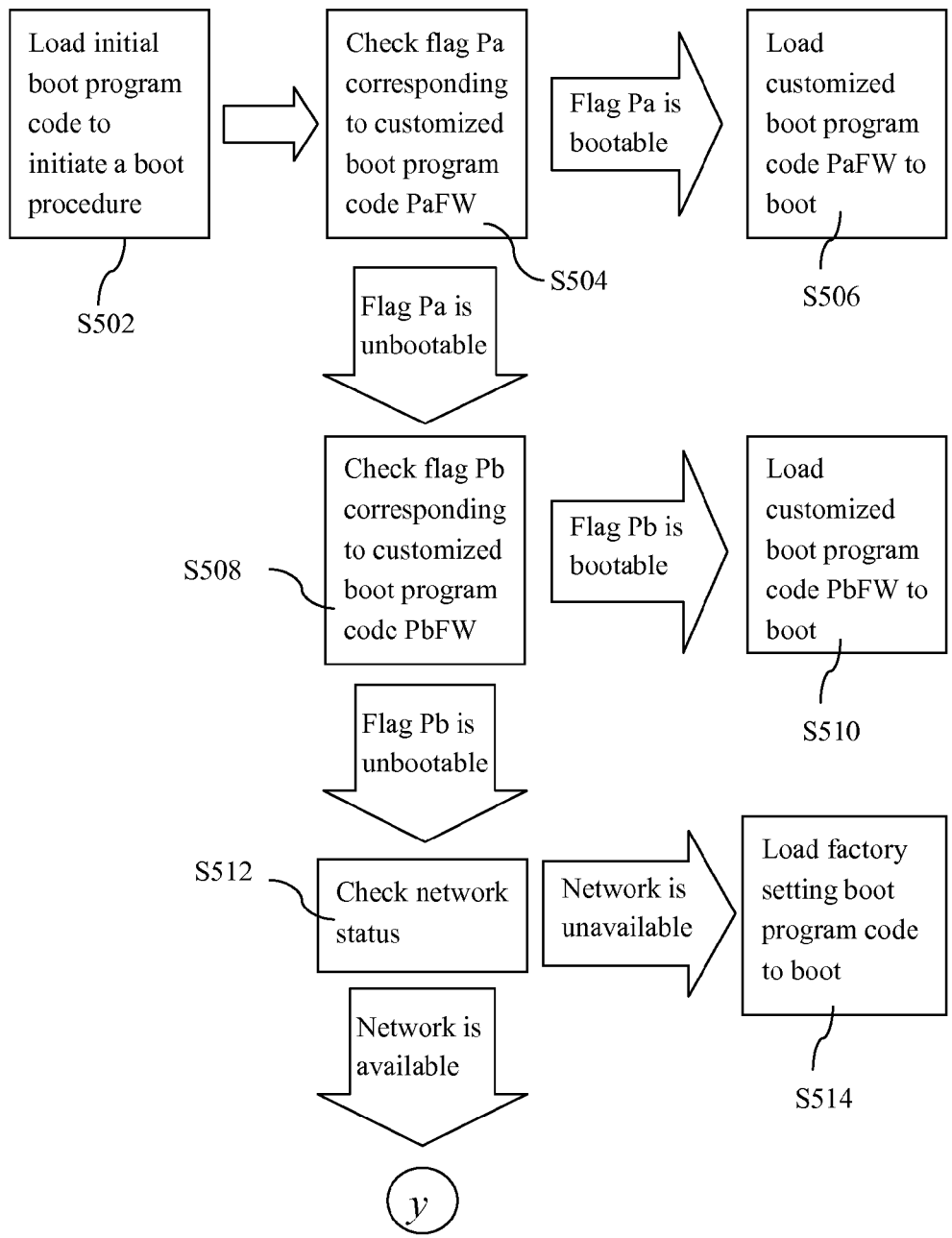
FIG. 5 is a flowchart of a boot method according to one embodiment of the present invention.
Figure 5:
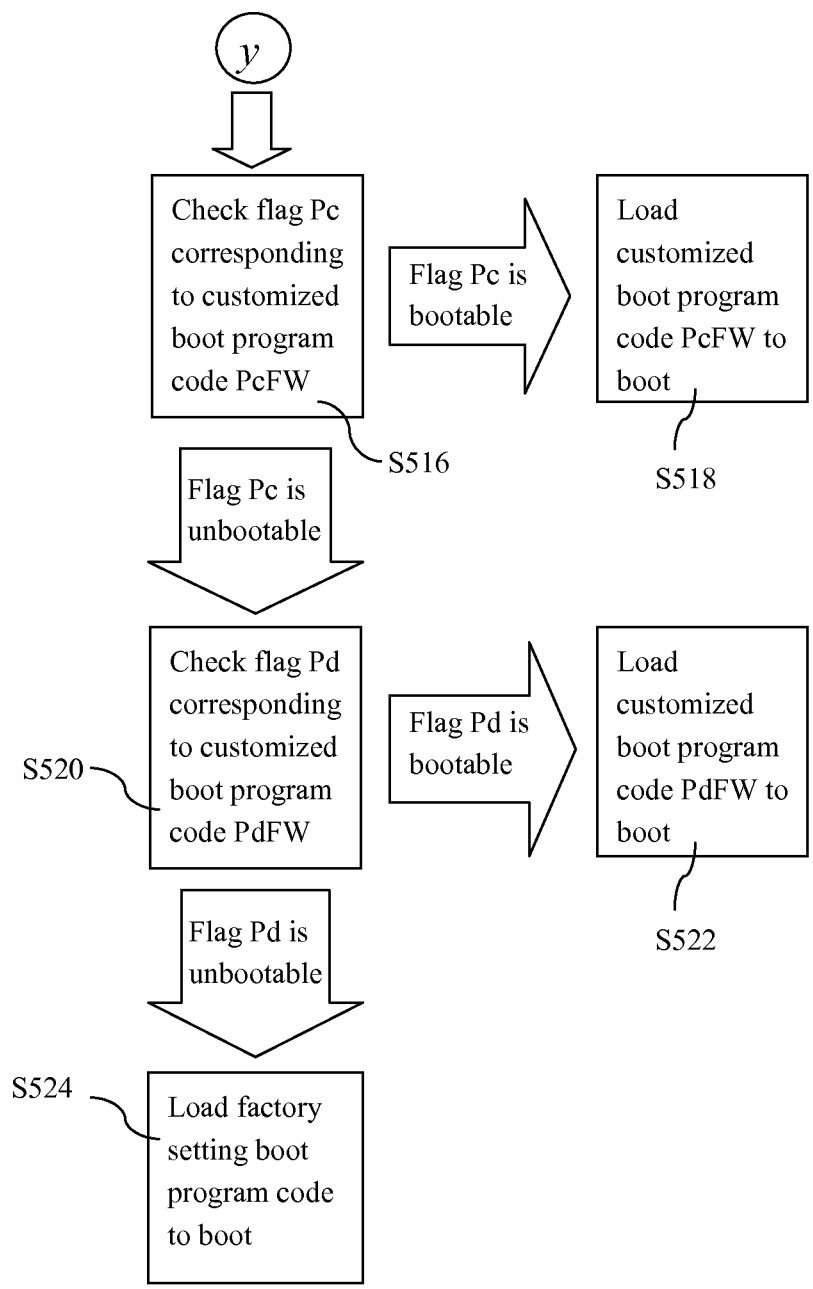

In FIG. 5, the initial boot program code is loaded into a memory 44 from the UEFI BIOS 42, and a CPU 46 executes the initial boot program code in the memory 44 to proceed a first phase of boot (step S502). Since the initial boot program code is configured to enable a network connection, the platform system having the UEFI BIOS 42 will be able to connect a network after the first phase of boot is performed. Then, the CPU 46 accesses flags Pa and Pb in boot information stored in the UEFI BIOS to determine which of the customized boot program codes PaFW (in correspondence with the flag Pa) and PbFW (in correspondence with the flag Pb) is to be executed.

Firstly, the CPU 46 checks the flag Pa corresponding to the customized boot program code PaFW to determine whether the customized boot program code PaFW is to be executed to perform a second phase of boot (step S504). If the flag Pa is set to bootable, the customized boot program code PaFW will be loaded into the memory 44 and be executed to perform a second phase of boot (step S506).

If the flag Pa is set to unbootable, the CPU 46 checks the flag Pb corresponding to the customized boot program code PbFW to determine whether the customized boot program code PbFW is to be executed to perform a second phase of boot (step S508). If the flag Pb is set to bootable, the customized boot program code PbFW will be loaded into the memory 44 and executed to perform a second phase of boot (step S510).

In case the flags Pa and Pb are both set to unbootable, the status of the network connection will be checked (step S512). If the network connection is unavailable, a factory setting boot program code will be loaded into the memory 44 and executed to perform a second phase of boot (step S514).

If the network connection is available, however, the CPU 46 reads flags Pc and Pd in boot information stored in the remote server 48 to determine which of the customized boot program code PcFW (corresponding to the flag Pc) and the customized boot program code PdFW (corresponding to the flag Pd) stored in the remote server 48 is to be executed.

Similarly, the CPU 46 checks the flag Pc corresponding to the customized boot program code PcFW to determine whether the customized boot program code PcFW is to be executed to perform a second phase of boot (step S514). If the flag Pc is set to bootable, the customized boot program code PcFW will be downloaded from the remote server 48 into the memory 44, and be executed to perform a second phase of boot (step S516).

If the flag Pc is set to unbootable, the CPU 46 checks the flag Pd corresponding to the customized boot program code PdFW to determine whether the customized boot program code PdFW is to be executed to perform a second phase of boot (step S518). If the flag Pd is set to bootable, the customized boot program code PdFW will be downloaded from the remote server 48 into the memory 44, and be executed to perform a second phase of boot (step S520).

However, if the flags Pc and Pd are both set to unbootable, a factory setting boot program code is loaded into the memory 44 and executed to perform a second phase of boot (step S522).

Figure 6:
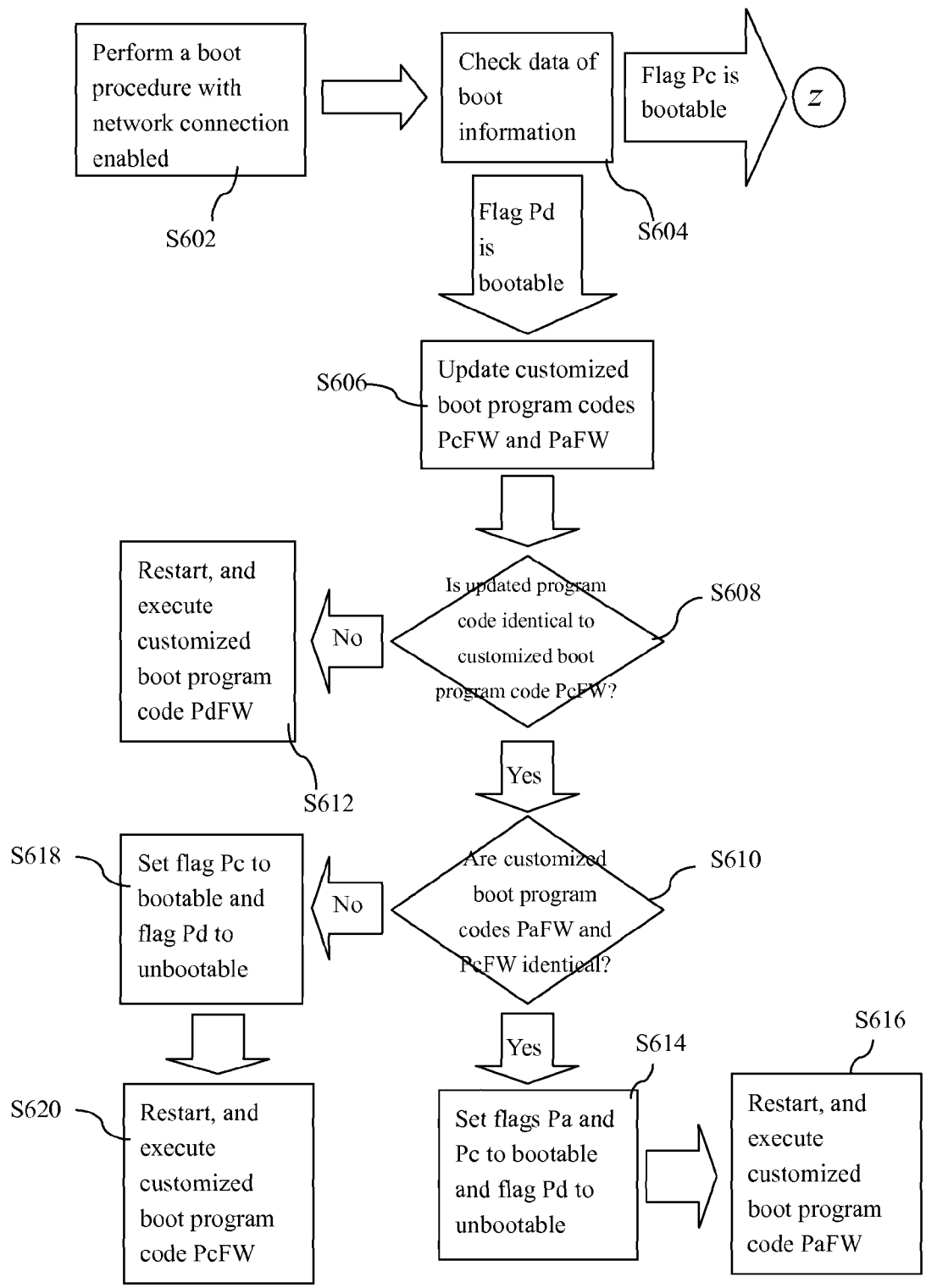
FIG. 6 is a flowchart of a boot and update method according to one embodiment of the present invention.
Figure 6:
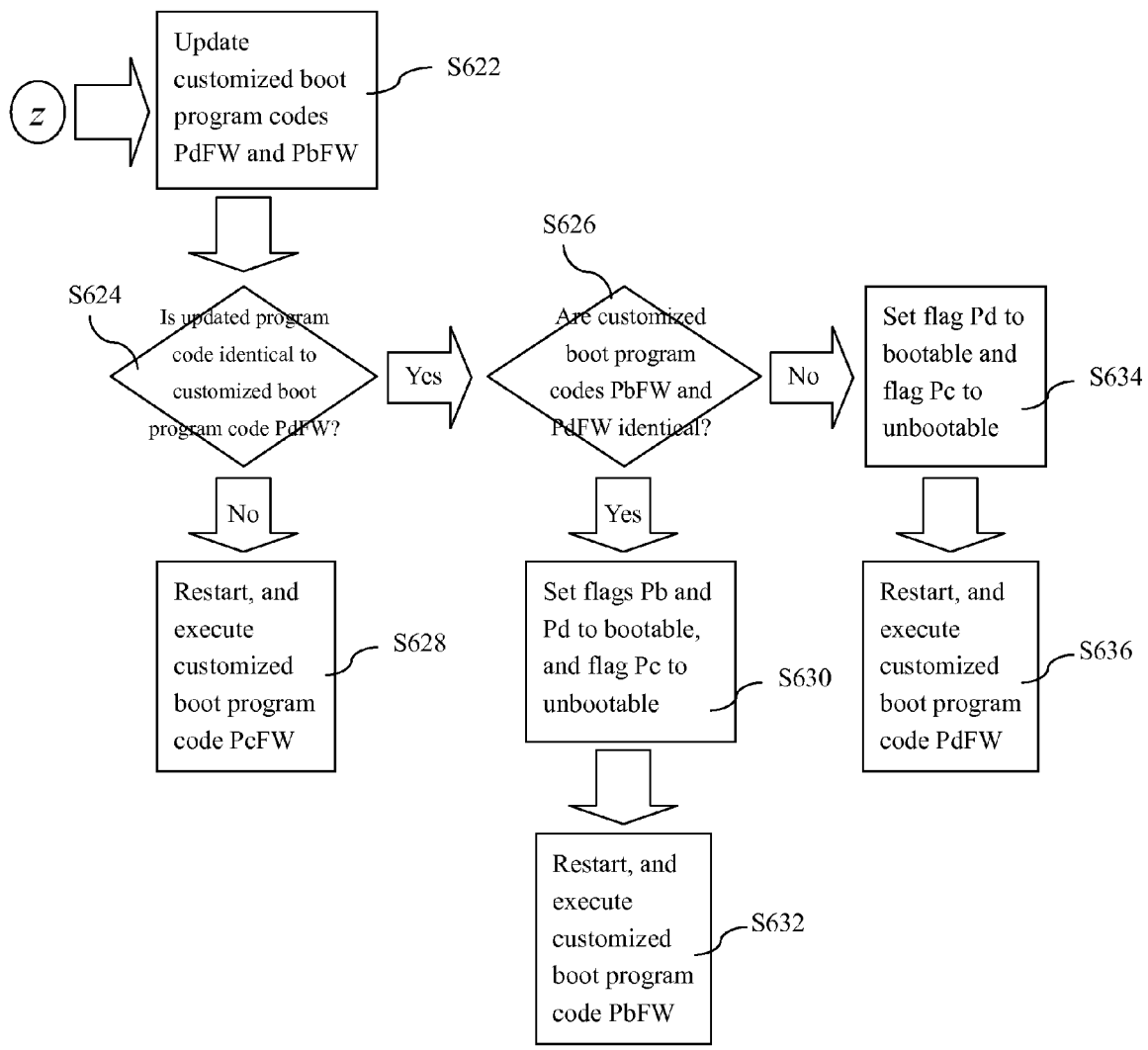

Furthermore, FIG. 6 shows a flowchart of a boot and update method according to the present invention for a local host connecting with a remote server, and the flow steps therein are explained with reference to the components shown in FIG. 4.

In the beginning step S602 of FIG. 6, a platform system performs a boot procedure comprising flow steps S502, S504, S508 and S512 as shown in FIG. 5; since there is no customized boot program code allowed to be executed in the local host and the network is available, the boot procedure continues from step S516 to step S518, S522 or S524.

After the boot procedure is completed, a program code of system firmware file is loaded from a recording medium or an external network into a memory of the remote server 48 so as to update one of the customized boot program codes PcFW and PdFW which needs to be updated.

However, the boot procedure involving the steps of accessing the remote server 48 implies that the customized boot program codes PaFW and PbFW are unbootable according to the flags Pa and Pb set in the local host. Therefore, the customized boot program codes PaFW and PbFW in the local host have to be updated as well as the customized boot program codes in the remote server, and the flags Pa and/or Pb will be correspondingly set to bootable thereafter.

In this embodiment, the CPU 46 reads flags Pc and Pd corresponding to the customized boot program codes PcFW and PdFW respectively from the boot information stored in the remote server 48, and updates the partition of the customized boot program code PcFW or PdFW accordingly (step S604).

If the flag Pd is set to bootable, the partition storing the customized boot program code PcFW will be updated with the program code of system firmware file stored in the remote server 48 and the partition storing the customized boot program code PaFW will be updated with the program code of system firmware file stored in the memory of the platform system (step S606). Then, it is determined whether the program code of system firmware file is identical to the updated customized boot program code PcFW stored in the updated partition (step S608).

If the program code of system firmware file is identical to the updated customized boot program code PcFW, it is then determined whether the updated customized boot program code PcFW is identical to the updated customized boot program code PaFW stored in the updated partition (step S610); if the program code of system firmware file is different from the updated customized boot program code PcFW, the platform system of the local host restarts and performs a boot procedure composed of aforementioned flow steps S502, S504, S508, S512, S516, S520 and S522 in which the customized boot program code PdFW is loaded and executed (step S612).

In case the program code of system firmware file is identical to the updated customized boot program code PcFW and the updated program codes of the customized boot program codes PcFW and PaFW are identical, the flag Pd in the boot information stored in the remote server 48 and corresponding to the customized boot program code PdFW will be set to unbootable, and both the flags Pc and Pa corresponding respectively to the customized boot program codes PcFW (stored in the remote server 48) and PaFW (stored in the local host) will be set to bootable (step S614). Then, the platform system of the local host restarts and performs a boot procedure composed of aforementioned flow steps S502, S504 and S506 in which the customized boot program code PaFW is loaded and executed (step S616).

In case the program code of system firmware file is identical to the updated customized boot program code PcFW and the updated program codes of the customized boot program codes PcFW and PaFW are not identical, the flag Pd in the boot information stored in the remote server 48 and corresponding to the customized boot program code PdFW will be set to unbootable, and the flag Pc corresponding to the customized boot program code PcFW stored in the remote server 48 will be set to bootable (step S618). Then, the platform system of the local host restarts and performs a boot procedure composed of aforementioned flow steps S502, S504, S508, S512, S516 and S518 in which the customized boot program code PcFW is loaded and executed (step S620).

Referring back to step S604, if the flag Pc is set to bootable, the partition storing the customized boot program code PdFW will be updated with the program code of system firmware file stored in the remote server 48, and the partition storing the customized boot program code PbFW will be updated with the program code of system firmware file stored in the local host (step S622). Then, it is determined whether the program code of system firmware file is identical to the updated customized boot program code PdFW in the updated partition (step S624).

If the program code of system firmware file is identical to the updated customized boot program code PdFW, it is then determined whether the updated customized boot program code PdFW in the updated partition is identical to the updated customized boot program code PbFW in the local host (step S626); if the program code of system firmware file is different from the updated customized boot program code PdFW, the platform system of the local host restarts and performs a boot procedure composed of aforementioned flow steps S502, S504, S508, S512, S516 and S518 in which the customized boot program code PcFW is loaded and executed (step S628).

In case the program code of system firmware file is identical to the updated customized boot program code PdFW and the updated program codes of the customized boot program codes PdFW and PbFW are identical, the flag Pc in the boot information stored in the remote server 48 and corresponding to the customized boot program code PcFW will be set to unbootable, and both the flags Pd and Pb corresponding respectively to the customized boot program codes PdFW (stored in the remote server 48) and PbFW (stored in the local host) will be set to bootable (step S630). Then, the platform system of the local host restarts and performs a boot procedure composed of aforementioned flow steps S502, S504, S508 and S510 in which the customized boot program code PbFW is loaded and executed (step S632).

In case the program code of system firmware file is identical to the updated customized boot program code PdFW and the updated program codes of the customized boot program codes PdFW and PbFW are not identical, the flag Pc in the boot information stored in the remote server 48 and corresponding to the customized boot program code PcFW will be set to unbootable, and the flag Pd corresponding to the customized boot program code PdFW stored in the remote server 48 will be set to bootable (step S634). Then, the platform system of the local host restarts and performs a boot procedure composed of aforementioned flow steps S502, S504, S508, S512, S516, S520 and S522 in which the customized boot program code PdFW is loaded and executed (step S636).

The boot and update method for a platform system comprising a UEFI BIOS according to the present invention described above is implemented in the form of a program which can be stored in a recording medium. When said program is loaded from the Internet or a recording medium and executed by, for example, a computer, the boot and update method illustrated in the foregoing description and drawings can thus be implemented.

The present invention provides a boot system comprising a UEFI BIOS, a boot method for a platform system comprising a UEFI BIOS, and a boot and update method for a platform system comprising a UEFI BIOS. An advantage of the present invention is resulted from the use of a single hardware having multiple partitions in which boot program codes for boot and update are stored respectively, and the boot program codes respectively stored in the partitions is updated, whereby the mechanism of multiple BIOS can be achieved without increasing the hardware cost of the platform system.

Although the present invention has been explained above in relation to its preferred embodiment and exemplary drawings, it shall not be considered limited thereby. It is to be understood that many possible modifications, omissions and variations can be made by those skilled in the art without departing from the scope of the present invention as hereinafter claimed.

BRIEF DESCRIPTION OF THE REFERENCE NUMERALS

10 Boot system
12, 42 UEFI BIOS
14, 44 Memory
16, 46 CPU
48 Remote server

What is claimed is:

1. A boot method for a platform system including a Universal Extensible Firmware Interface (UEFI) Basic Input/Output System (BIOS), the UEFI BIOS having partitions storing an initial boot program code, a factory setting boot program code, a first customized boot program code, a second customized boot program code and boot information respectively, the method comprising steps of:
   (a) loading the initial boot program code stored in one of the partitions of the UEFI BIOS into a memory, and executing the initial boot program code stored in the memory by a CPU to perform a first phase of boot; and
   (b) loading one of the factory setting boot program code, the first customized boot program code and the second customized boot program code stored in the partitions of the UEFI BIOS into the memory according to data in the boot information, and executing the program code loaded in the memory to perform a second phase of boot by the CPU.

2. The boot method according to claim 1, wherein the step of (b) comprises steps of:
   loading the first customized boot program code stored in one of the partitions of the UEFI BIOS into the memory if a first flag in the boot information and corresponding to the first customized boot program code is set to bootable, and executing the first customized boot program code stored in the memory to perform the second phase of boot by the CPU;
   loading the second customized boot program code stored in one of the partitions of the UEFI BIOS into the memory if a second flag in the boot information and corresponding to the second customized boot program code is set to bootable, and executing the second customized boot program code in the memory to perform the second phase of boot by the CPU; and
   loading the factory setting boot program code stored in one of the partitions of the UEFI BIOS into the memory if none of the first and the second flags is set to bootable, and executing the factory setting boot program code in the memory to perform the second phase of boot by the CPU.

3. The boot method according to claim 1, wherein a security phase program code and a Pre-Extensible Firmware Interface Initialization (PEI) phase program code in the memory are executed by the CPU to perform the first phase of boot; and
   a Driver Execution Environment (DXE) phase program code and a Boot Device Selection (BDS) phase program code in the memory are executed by the CPU to perform the second phase of boot.

4. A boot method for a platform system including a UEFI BIOS, the UEFI BIOS having partitions storing an initial boot program code, a factory setting boot program code, a first customized boot program code, a second customized boot program code and boot information respectively, the method comprising steps of:
   (c) loading a program code of system firmware file into a memory;
   (d) determining which one of the partitions storing the first and the second customized boot program codes respectively is to be updated according to data of the boot information, and updating the determined one of the partitions storing the first and the second customized boot program codes respectively with the program code of system firmware file stored in the memory; and
   (e) loading the updated one of the first and the second customized boot program codes stored respectively in the partitions of the UEFI BIOS into the memory, and executing the updated one of the first and the second customized boot program codes in the memory to boot the platform system.

5. The boot method according to claim 4, before the step of (c) the method further comprising steps of:
   (a) loading the initial boot program code stored in one of the partitions of the UEFI BIOS into the memory, and executing the initial boot program code stored in the memory to perform a first phase of boot; and
   (b) loading one of the first and the second customized boot program codes stored in the partitions of the UEFI BIOS into the memory according to data in the boot information, and executing the program code loaded in the memory to perform a second phase of boot by the CPU.

6. The boot method according to claim 5, wherein the step of (b) comprises the step of:
   if a first flag in the boot information and corresponding to the first customized boot program code is set to bootable, loading the first customized boot program code stored in one of the partitions of the UEFI BIOS into the memory and executing the first customized boot program code stored in the memory to perform the second phase of boot by the CPU; and
   if a second flag in the boot information and corresponding to the second customized boot program code is set to bootable, loading the second customized boot program code stored in one of the partitions of the UEFI BIOS into the memory and executing the second customized boot program code stored in the memory to perform the second phase of boot by the CPU.

7. The boot method according to claim 5, wherein a security phase program code and a PEI phase program code in the memory are executed by the CPU to perform the first phase of boot; and
   a DXE phase program code and a BDS phase program code in the memory are executed by the CPU to perform the second phase of boot.

8. The boot method according to claims 4, wherein the step of (d) comprises the step of:
   updating the partition storing the second customized boot program code with the program code of system firmware file stored in the memory if a first flag in the boot information and corresponding to the first customized boot program code is set to bootable.

9. The boot method according to claim 8, wherein the step of (e) comprises the steps of:

determining whether the updated program code in the partition corresponding to the second customized boot program code is identical to the program code of system firmware file;

if the updated program code in the partition corresponding to the second customized boot program code is identical to the program code of system firmware file, setting the first flag to unbootable and a second flag in the boot information and corresponding to the second customized boot program code to bootable, loading the updated second customized boot program code in one of the partitions of UEFI BIOS into the memory, and executing the updated program code in the memory by the CPU to boot the platform system; and if the updated program code in the partition corresponding to the second customized boot program code is not identical to the program code of system firmware file, loading the first customized boot program code in one of the partitions of UEFI BIOS into the memory, and executing the program code in the memory by the CPU to boot the platform system.

10. The boot method according to claims 4, wherein the step of (d) comprises the step of:

updating the partition storing the first customized boot program code with the program code of system firmware file stored in the memory if a second flag in the boot information and corresponding to the second customized boot program code is set to bootable.

11. The boot method according to claim 10, wherein the step of (e) comprises the steps of:

determining whether the updated program code in the partition corresponding to the first customized boot program code is identical to the program code of system firmware file;

if the updated program code in the partition corresponding to the first customized boot program code is identical to the program code of system firmware file, setting the first flag to bootable and a second flag in the boot information and corresponding to the second customized boot program code to unbootable, loading the updated first customized boot program code in one of the partitions of UEFI BIOS into the memory, and executing the updated program code in the memory by the CPU to boot the platform system; and if the updated program code in the partition corresponding to the first customized boot program code is not identical to the program code of system firmware file, loading the second customized boot program code in one of the partitions of UEFI BIOS into the memory, and executing the program code in the memory by the CPU to boot the platform system.

12. A boot method for a platform system including a UEFI BIOS in which an initial boot program code, a factory setting boot program code, a first customized boot program code and first boot information are stored, the method comprising steps of:

(a) loading the initial boot program code into a memory, and executing the initial boot program code stored in the memory to perform a first phase of boot, whereby the platform system is enabled to connect with a remote server in which a second customized boot program code and second boot information are stored; and (b) loading one of the factory setting boot program code, the first customized boot program code and the second customized boot program code into the memory according to data in the first and second boot information, and executing the program code loaded into the memory to perform a second phase of boot.

13. The boot method according to claim 12, wherein the step of (b) comprises steps of:

if a first flag in the first boot information and corresponding to the first customized boot program code is set to bootable, loading the first customized boot program code stored in the UEFI BIOS into the memory and executing the first customized boot program code stored in the memory to perform the second phase of boot; and if the first flag is set to unbootable and a second flag in the second boot information and corresponding to the second customized boot program code is set to bootable, downloading the second customized boot program code from the remote server into the memory and executing the second customized boot program code stored in the memory to perform the second phase of boot.

14. The boot method according to claim 12, wherein the step of (b) comprises steps of:

if a second flag in the second boot information and corresponding to the second customized boot program code is set to bootable, downloading the second customized boot program code from the remote server into the memory and executing the second customized boot program code in the memory to perform the second phase of boot; and if the second flag is set to unbootable and a first flag in the first boot information and corresponding to the first customized boot program code is set to bootable, loading the first customized boot program code stored in the UEFI BIOS into the memory and executing the first customized boot program code stored in the memory to perform the second phase of boot.

15. The boot method according to claim 13, wherein the step of (b) comprises step of:

if none of the first and the second flags is set to bootable, loading the factory setting boot program code from the UEFI BIOS into the memory and executing the factory setting boot program code in the memory to perform the second phase of boot.

16. A boot system for a platform system comprising:

a UEFI BIOS having partitions storing an initial boot program code, a factory setting boot program code, a first customized boot program code and first boot information respectively, wherein the platform system is enabled to connect with a remote server in which a second customized boot program code and second boot information are stored;

a memory for storing the initial boot program code, the factory setting boot program code, the first customized boot program code or the second customized boot program code; and a CPU for executing the initial boot program code, the factory setting boot program code, the first customized boot program code or the second customized boot program code stored in the memory so as to boot the platform system, wherein the boot system implements the boot method according to any one of claims 12-15.

* * * * *